United States Patent [19]

Albright

[11] 3,800,287

[45] Mar. 26, 1974

[54] DATA PROCESSING SYSTEM HAVING AUTOMATIC INTERRUPT IDENTIFICATION TECHNIQUE

[75] Inventor: Richard A. Albright, Winter Park, Fla.

[73] Assignee: Honeywell Information Systems Inc., Waltham, Mass.

[22] Filed: June 27, 1972

[21] Appl. No.: 266,759

[52] U.S. Cl. .............. 340/172.5

[51] Int. Cl. .............. G06f 9/18

[58] Field of Search .............. 340/172.5

[56] References Cited

UNITED STATES PATENTS

| | | | |
|---|---|---|---|
| 3,478,320 | 11/1969 | Couleur et al. | 340/172.5 |
| 3,534,339 | 10/1970 | Rosenblatt | 340/172.5 |
| 3,599,162 | 8/1971 | Byrns et al. | 340/172.5 |
| 3,599,176 | 8/1971 | Cordero, Jr. et al. | 340/172.5 |

*Primary Examiner*—Gareth D. Shaw
*Assistant Examiner*—John P. Vandenburg
*Attorney, Agent, or Firm*—John S. Solakian; Ronald T. Reiling

[57] ABSTRACT

A plurality of devices are coupled with a data processor over a common electrical bus. Each device makes its own interrupt request which is not seen by the processor until a request enable signal is generated therefrom. In response to the enable signal, the interrupt requesting device of highest priority provides its device address or identification to the processor. The device address which is independent of the type of the device, i.e., magnetic tape, disk, or teletype, etc., is augmented with a memory table base address in order to address the interrupt service routine for the interrupting device. The highest priority device is indicated by a priority network which in combination with the interrupt logic of each device, allows the devices to arbitrate amongst themselves, without the knowledge of the processor, to determine which device is to send its device address to the processor.

10 Claims, 1 Drawing Figure

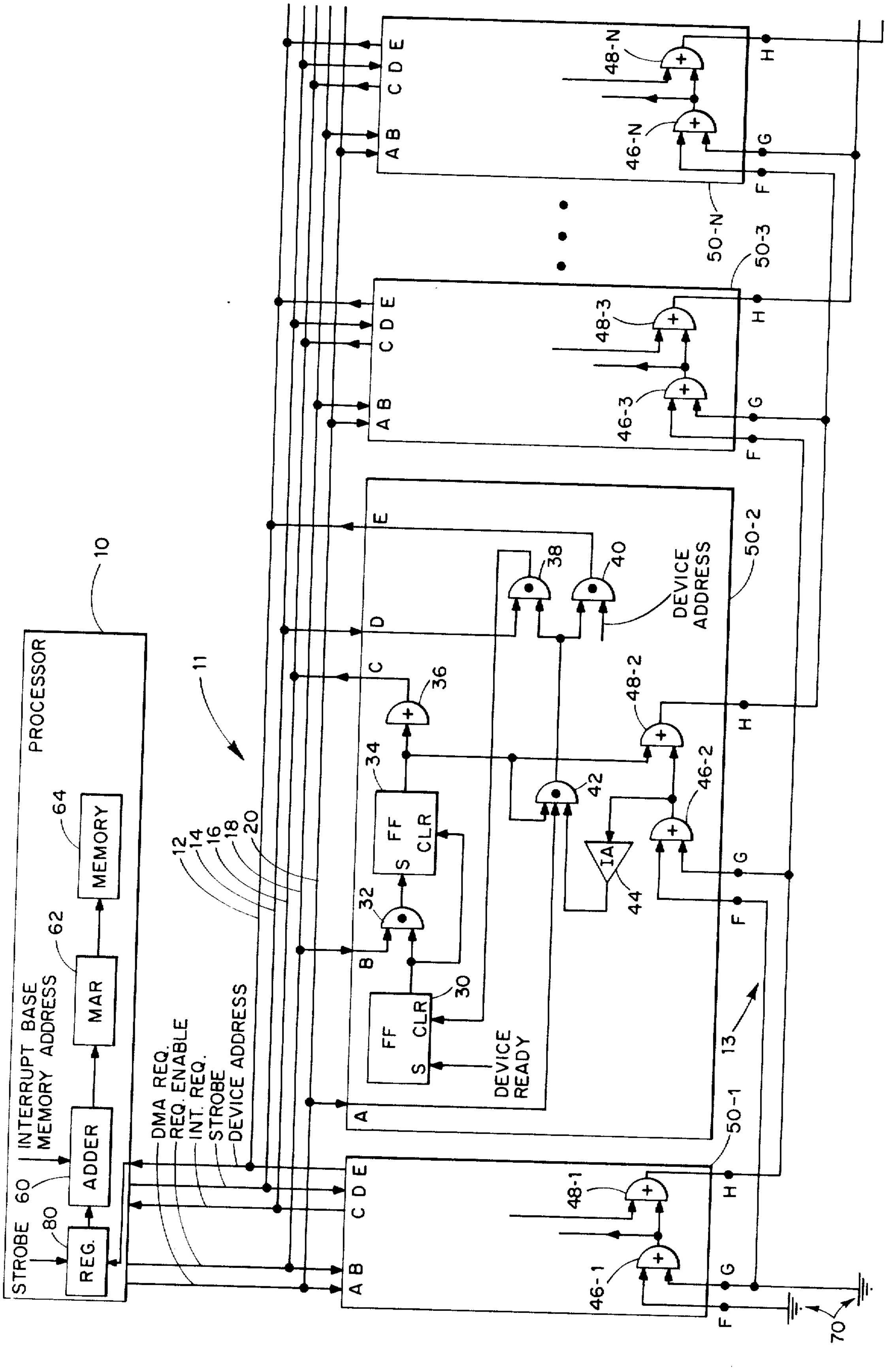
PROCESSOR
MEMORY
MAR
ADDER
REG.
STROBE
INTERRUPT BASE MEMORY ADDRESS
DMA REQ.
REQ. ENABLE
INT. REQ.
STROBE
DEVICE ADDRESS
FF
S
CLR
DEVICE READY
DEVICE ADDRESS
IA
A B C D E F G H

DATA PROCESSING SYSTEM HAVING AUTOMATIC INTERRUPT IDENTIFICATION TECHNIQUE

BACKGROUND OF THE INVENTION

The present invention relates generally to data processing systems and more particularly to automatic interrupt identification of input/output devices coupled with a data processor in the system.

In the prior art, there exists various techniques for identifying interrupting conditions. This problem becomes more critical when each of the devices are coupled over a common electrical bus with a data processor. An example of this type of system is described in an article by D. Chertkow and R. Cady entitled "Unified Bus Maximizes Minicomputer Flexibility," printed in the Dec. 21, 1970 edition of Electronics magazine at pages 47–52.

The present invention improves on the systems of the prior art by at least the following: minimizing the number of lines required on the bus for the device address, allowing the device address to be completely independent of the type of device and the physical location of the device on the bus, allowing the device address to be changeable thereby minimizing the effect on the processor's time during the arbitration of the devices for access to the bus, and increasing the speed of response of the interrupt request and the placing of the device address on the bus.

It is accordingly a primary object of the invention to provide an improved interrupt identification technique having the advantages indicated hereinabove.

SUMMARY OF THE INVENTION

The above and other objects of the invention are attained by providing a data processor coupled via a common electrical bus with a plurality of devices, each device provided with means for indicating that said device is ready for interrupt and the processor coupled to provide an enable signal indicating that an interrupt request will be serviced. Each of the devices are provided with a means responsive to the enable signal and the device ready signal for transferring an interrupt request to the processor. In the absence of a higher level priority operation such as direct memory access with the processor, the highest priority device provides its device address to the processor which utilizes the device address to index from a base address thereby addressing an interrupt service routine associated with the interrupting device.

BRIEF DESCRIPTION OF THE DRAWINGS

The manner in which the application of the present invention is constructed, and its mode of operation, will best be understood in the light of the following detailed description, together with the accompanying drawing, in which the sole FIGURE is a block diagram of the apparatus of the invention.

DETAILED DESCRIPTION OF THE PREFERRED EMBODIMENT

In the sole FIGURE, there is shown a processor 10 coupled over a common electrical bus 11, to a plurality of devices 50–1 to 50–N. Processor 10 in addition to including other logic also includes a register 80, an adder 60, a memory address register 62 and a memory 64. The devices 50 are of the input/output type and may be devices such as a magnetic tape unit, a magnetic disc storage unit, a teletypewriter, a magnetic drum storage unit, a line printer, a card reader or card punch, etc. Each of the devices includes logic peculiar to itself and in addition includes logic identical to that logic which is particularly shown in device 50–2. Each device 50 is also coupled with a priority net 13 which may be considered to be included as part of bus 11.

The bus 11 is coupled via terminals A, B, C, D and E as well as terminals F, G and H to each device. That is, each device 50 receives the signals on the particular lines of bus 11 and each device transfers information over the same lines of bus 11. In order of operation, line 18 is coupled to receive a request enable signal which allows the devices to generate an interrupt request (i.e., a request to transfer information) on line 16 of bus 11. In the absence of a direct memory access (DMA) request signal (i.e., a signal of higher priority which allows a device via a different priority structure to gain access with the memory 64) on line 20 of bus 11, the devices are allowed to place their device address or identification on lines 12 of bus 11. The generation of the strobe signal on line 14 via processor 10 prevents any further change in the device address such that between the generation of the request enable and the strobe signal, any number of device addresses may have appeared on lines 12. That is, if at the time of the request enable signal, device 50–N is of highest priority as determined by priority net 13, to be hereinafter discussed, then its device address will have been placed on the line 12. However, if device 50–2 is ready for interrupt and this condition occurs before the strobe signal is generated, then its device address would replace that of device 50–N and so on until the strobe signal is generated on line 14 in which case the device address would be latched in register 80 by the strobe signal or alternatively in register 62 thereby eliminating the need for register 80.

The device address or identification which is for purposes of illustration a six-bit address indicating that up to 64 devices may be utilized in the system, is coupled to one input of adder 60 over multiple lines (i.e., six lines) 12 via register 80. The other input of adder 60 receives an interrupt base memory address which when added to the device address, creates the address of the location in memory 64 whose contents point to the interrupt service routine or program which will respond to this interrupt. Sixty-four such locations, by way of example, are provided for, beginning at the interrupt base memory address and continuing for 64 locations in sequence beyond it. After the interrupt service routine is performed, or a portion thereof is performed, a request enable signal is again provided on line 18 and the process repeats.

Priority net 13 is described in the copending application entitled "Priority Network," filed June 22, 1972, and whose U.S. Pat. Ser. No. is 266,768. The priority net is arranged such that the device 50–1 which is closest to the processor 10 as indicated by the physical connection on priority net 13. Accordingly, the device 50–N has the lowest priority. Alternatively, the devices 50–N furthest away from processor 10 may have the highest priority by simply reversing the direction of the priority logic gates 46 and 48 and the direction from which the ground signal, as indicated by symbols 70, originates, i.e., device 50–N would see the ground signals first. Before the device address of a particular device may be placed on lines 12, it must receive indication that it in fact has the highest priority. In a particular arrangement, OR gates 46 are coupled such that the receipt of a ground voltage level or false state indicates that the particular device has the highest priority. Thus, gate 46–1 is coupled to receive the false state as indicated by ground symbols 70. Accordingly, device 50–1 will be enabled to place its device address on lines 12 unless it is in fact not ready to make an interrupt. Assuming that device 50–1 is not ready, then OR gate 48–1 will receive a ground voltage level or false state from the interrupt identification logic of device 50–1 and will also receive the false state from OR gate 46–1 thereby indicating a false state at its output. Each of the OR gates 48 of the devices 50 are coupled in such a manner. Accordingly, device 50–2 will be the highest priority device if it receives the false state from OR gate 48–1 and will place its device address on lines 12 if the device ready signal peculiar to device 50–2 sets flip-flop 30. This assumes that the DMA request signal has not been received at terminal A.

The priority net 13 may employ a look-back feature. In this case, for purposes of illustration, the look-back feature extends back two devices such that the propogation delay is reduced to one-half of the number of devices. It can be seen from the following discussion that the speed may be further increased by employing a further extended look-back, such as a look-back of four devices, as shown in the aforementioned application, thereby decreasing gate delays to one-quarter of the number of devices. Thus, it can be seen that terminal F of each device 50 is coupled to a device which is two devices closer to processor 10. This can be best shown with regard to device 50–3 wherein its terminal F is connected to terminal H of device 50–1. Further, each device looks back to the preceding device which for terminal G of device 50–3 is shown to be coupled to terminal H of device 50–2. Thus, device 50–3 can tell whether it is the highest priority device by receipt of the false state simultaneously on terminals F and G at the input of OR gate 46–3. It can be seen that as additional device look-back is implemented, all that is required is that the OR gates 46 have additional inputs from such additional devices such that no further gates are required. This further enhances the economics and speed of the system.

As recited hereinbefore, each device 50 includes specific logic for providing the automatic interrupt identification technique of the invention. Device 50–2 is shown to illustrate the logic in detail, and is exemplary of the logic for each of the other devices 50. Flip-flop 30 is set when device 50–2 is ready to request an interrupt of processor 10. The output of flip-flop 30 is coupled to set flip-flop 34 when processor 10 has provided a request enable signal. This then allows the generation of an interrupt request which is provided on line 16 to processor 10. In the absence of a DMA request, and when flip-flop 34 is set, and assuming that device 50–2 is the highest priority device, that is, device 50–1 is not ready for requesting an interrupt, then the third input of AND gate 42 receives a true state signal via inverting amplifier 44 to generate a gate signal at the output of gate 42. This gate signal is utilized to enable AND gates 40 to place the device address on lines 12 of bus 11. Once the processor 10 generates the strobe signal on line 14, this latches the device address in register 80. The strobe signal is then coupled with the gate signal to enable AND gate 38 to provide a signal which then clears flip-flop 30, and in turn clears flip-flop 34, thereby disabling AND gate 42. After the processor has provided the interrupt service routine for interrupting device 50–2, then the request enable signal is again placed on line 18.

It can be seen then that the apparatus of the invention has been shown to include four basic states, namely the wait, request, active, and inactive states. The wait state is defined to be that time between when a device indicates that an interrupt is to be made to the time that the request enable signal indicates that new requests will be considered. The request state is defined to be that time between when the request enable signal permits a new request and the time of generation of the strobe signal via processor 10. The active state is defined to be that time between the generation of the strobe signal and the generation of the request enable signal. The inactive state is defined to be that time between the generation of the request enable signal and the time of the next interrupt request.

Accordingly, it has been seen that the apparatus of the invention utilizes a minimal amount of lines to perform the automatic interrupt identification technique of the invention. More particularly, the device address lines are minimized to that number corresponding to the number of devices serviced. In this example, six lines were used for the device address to identify up to 64 devices. It can also be seen that the device address may be independent of the particular type of device. Further, the priority net of the apparatus of the invention has been implemented in such a way as to increase the speed of the system. It has also been seen that the device address has been utilized in combination with a base address to address the interrupt service routine for the particular interrupting device.

More particularly, it can be seen that the device address may not be only independent of the type of device but also independent of its location on the bus 11. For example, device 50–2 need not have the device address whose number is two. Each address may be any one of 64 numbers. Accordingly, should one want to change the priority of device 50–2 to a lower priority, then all that need be done is to plug device 50–2 into the bus 11 at some point further away from processor 10. This minimizes the impact on the system alterations required in addition to any impact on the software associated with the processor 10. Also, more particularly, the priority net has been shown to increase the speed of generation of the highest priority indication by employing a look-back feature which allows the interrupting device to look-back a plurality of devices to determine whether it is the highest priority device requesting an interrupt. For example, with a look-back of up to four devices, then in a system having sixty-four devices coupled with bus 11 and priority net 13, then only 16 gate delays would be seen in the propogation of the ground voltage level or false state throughout the full length of priority net 13. It has also been seen that the processor 10 need not know which device is in fact the interrupt requesting device until the highest priority device has had its device address latched in register 80 upon the generation of the strobe signal. Accordingly, the processor time utilized during interrupt identification has been minimal in that only a request enable signal has been generated in addition to the strobe signal and it is left up to the individual devices to determine which is to be the highest priority device and which is to place its device address on line 12. All that the processor knows is that there is an interrupt request on line 16, but it does not know nor does it care which device is requesting an interrupt until the strobe signal is generated.

Accordingly, what is claimed as new and novel and for which it is desired to secure Letters Patent is:

1. A data processing system comprising a data processor coupled over a common bus with a plurality of devices, said system further comprising:

A. a memory having an interrupt service routine for each of said devices;

B. means for determining the highest priority device which is ready to make an interrupt request;

C. means for transferring the device address of said highest priority device to said processor; and D. means for indexing from a base interrupt address by the number indicated by said device address so as to address the interrupt service routine for said highest priority interrupting device.

2. A system as in claim 1 wherein said means for determining comprises:

A. a priority line;

B. means in each of said devices for indicating whether the respective devices are ready to make an interrupt request;

C. gate means associated with each of said devices, said gate means coupled to receive a first signal from said priority line and a second signal from said associated device's means for indicating; and wherein D. said priority line is coupled between successive gate means of said devices such that a predetermined state of said first signal indicates that a previous device has the highest priority.

3. A system as in claim 1 wherein said means for determining comprises:

A. a plurality of priority lines;

B. means in each of said devices for indicating whether the respective devices are ready to make an interrupt request;

C. gate means associated with each of said devices, said gate means coupled to receive first signals from each of said priority lines and a second signal from said associated device's means for indicating; and wherein D. one of said priority lines is coupled between successive gate means of said devices and at least another of said priority lines is coupled between alternate successive gate means such that a predetermined state of either of said first signals indicates that a previous device has the highest priority.

4. A system as defined in claim 3 wherein a further predetermined state of either of said first signals indicates that said device, associated with said gate means receiving said further predetermined state of either of said first signals, has the highest priority, said highest priority indication generating a gate signal.

5. A system as defined in claim 4 further comprising:

A. means for indicating that an operation of higher priority is active on said bus; and B. means responsive to the absence of said higher priority operation and said gate signal for providing said device address to said bus.

6. A system as in claim 1 wherein said means for indexing comprises:

A. a table of addresses in said memory, each address in said table indicating the address of one of said interrupt service routines in said memory;

B. means for providing an interrupt base memory address for indicating the location of said table in said memory;

C. means for adding said device address to said interrupt base memory address thereby generating a memory address; and D. means for addressing the interrupt service routine indicated by said memory address.

7. A data processing system comprising:

A. a data processor;

B. a plurality of devices;

C. a common electrical bus for coupling said data processor for transfer of data with each of said devices;

D. means in each of said devices for indicating that said device is ready for said transfer;

E. means in said processor for enabling an interrupt request from said devices;

F. means responsive to said means for indicating and said means for enabling for transferring an interrupt request to said processor;

G. means responsive to the priority of said interrupt requests for transferring the address of the highest priority device to said processor; and H. means in said processor for utilizing said device address to address an interrupt service routine for the interrupting device.

8. A data processing system comprising a data processor coupled with a plurality of devices by means of a common bus, and means for determining the priority of said devices by their proximity on said bus to said processor, said system further comprising:

A. means in each of said devices for indicating that said device is ready to make an interrupt request;

B. means enabling the coupling for an interrupt request on said bus to said processor from each of said devices which are ready to make an interrupt request;

C. means in said processor for generating a strobe signal;

D. means for coupling on said bus to said processor the device address of the highest priority device which is ready to make an interrupt request between the time said means for enabling enables said coupling and the time said means for generating generates said strobe signal; and E. means for latching into said processor the device address of the highest priority device at the time said means for generating generates said strobe signal.

9. A system as in claim 8 further comprising:

A. a plurality of interrupt service programs in said memory, each program associated with a respective one of said devices;

B. a table in said memory, said table including a starting address for each of said programs;

C. means for providing the address of said table;

D. means for adding the device address of said highest priority interrupting device to said address of said table to produce a memory address; and E. means for addressing said memory with said memory address so that the interrupt service program of said highest priority interrupting device is accessed.

10. A system as in claim 9 wherein said means for determining comprises:

A. means in each of said devices for determining whether either of a plurality of preceding devices in closer proximity on said bus to said processor is enabled and ready to make an interrupt request; and B. means for enabling the one of said devices, which does not receive an indication that either of said plurality of preceding devices is enabled and ready to make an interrupt request, to make its own interrupt request if it is ready to do so.

* * * * *